Figure 1:
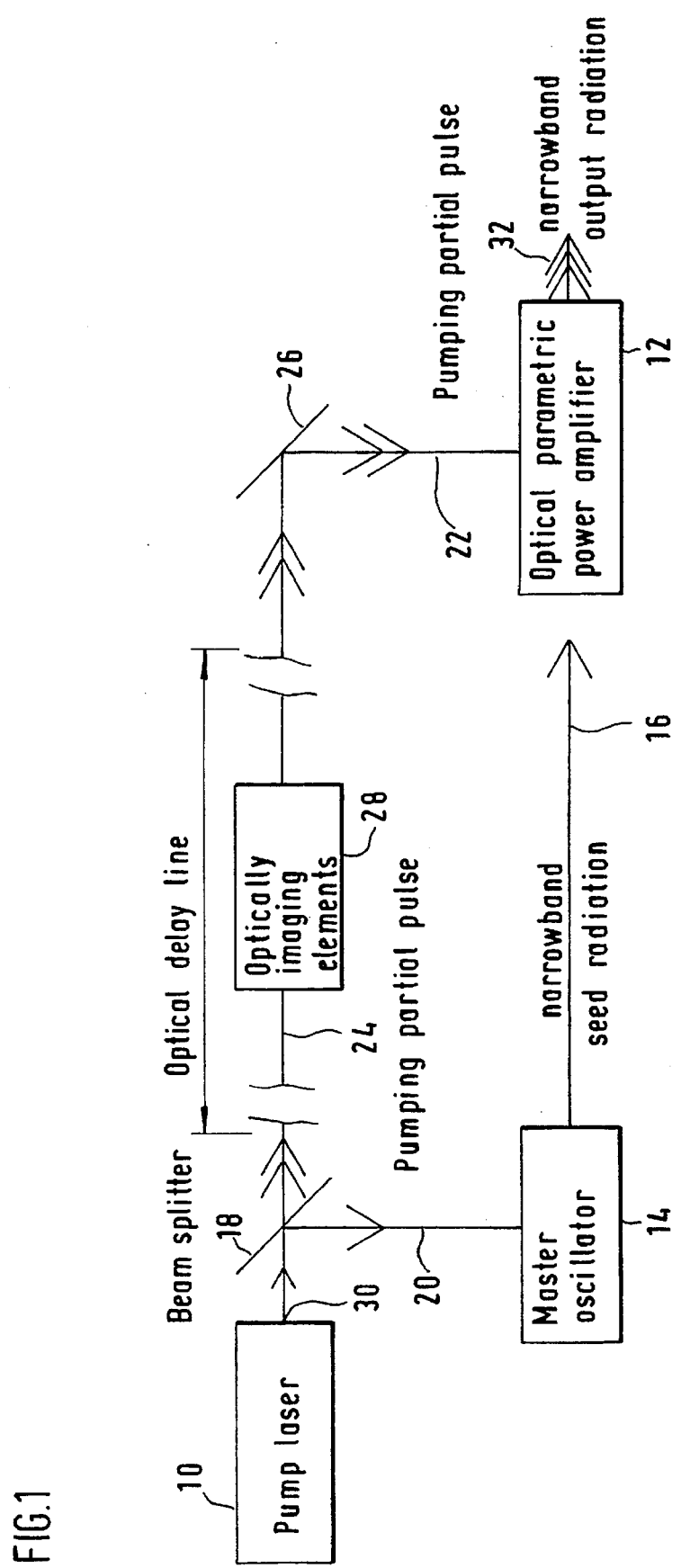

United States Patent

Stamm et al.

Patent Number: 5,671,241
Date of Patent: Sep. 23, 1997

[54] TUNABLE SOURCE OF NARROWBAND COHERENT RADIATION

[75] Inventors: Uwe Stamm, Gottingen; Peter Lokai, Bovenden, both of Germany

[73] Assignee: Lambda Physik Gesellschaft Zur Herstellung Von Lasern MGH, Germany

[21] Appl. No.: 658,716

[22] Filed: Jun. 5, 1996

[51] Int. Cl.$^6$ .................................................... H01S 3/10
[52] U.S. Cl. .................. 372/20; 372/92; 372/98; 372/700; 372/99; 372/101; 372/69; 359/330
[58] Field of Search ................... 372/92, 98, 99, 372/101, 700, 20, 22; 359/330

[56] References Cited

U.S. PATENT DOCUMENTS

| | | | |
|---|---|---|---|
| 4,349,907 | 9/1982 | Campillo et al. | 372/92 |
| 4,972,156 | 11/1990 | Gregor et al. | 330/4.3 |
| 5,033,057 | 7/1991 | Bosenberg et al. | 359/330 |
| 5,047,668 | 9/1991 | Bosenberg | 359/330 |
| 5,053,641 | 10/1991 | Cheng et al. | 359/330 |
| 5,117,126 | 5/1992 | Geiger | 359/330 |
| 5,159,487 | 10/1992 | Geiger et al. | 359/330 |
| 5,195,104 | 3/1993 | Geiger et al. | 359/330 |
| 5,390,211 | 2/1995 | Clark et al. | 372/92 |
| 5,947,668 | 9/1991 | Bosenberg | 359/330 |

FOREIGN PATENT DOCUMENTS

| | | | |
|---|---|---|---|
| 42 19 169 | 6/1992 | Germany | H01S 3/10 |

OTHER PUBLICATIONS

W.R. Bosenberg & D.R. Guyer, "Broadly tunable, single-frequencey optical parametric frequency-conversion system," *J. Opt. Soc. Am. B*, vol. 10, No. 9, Sep. 1993, pp. 1716–1722.

A. Fix, T. Schröder & R. Wallenstein, "Tunable β-barium borate optical parametric oscillator: operating characteristics with and without injection seeding," *J. Opt. Soc. Am. B*, vol. 10, No. 9, Sep. 1993, pp. 1744–1750.

Advertising Brochure, "SCANmate," produced by Lambda Physik, printed Apr. 1994, 6 pages in length.

J.Y. Zhang, J.Y. Huang, Y.R. Shen & Chen, "Optical parametric generation and amplification in barium borate and lithium tiborate crystals," *J. Opt. Soc. Am. B*, vol. 10, No. 9, Sep. 1993, pp. 1758–1764.

*Primary Examiner*—Leon Scott, Jr.
*Attorney, Agent, or Firm*—Limbach & Limbach L.L.P.

[57] ABSTRACT

A tunable source of narrowband coherent radiation comprises a pulsed pump laser (10), an optical parametric oscillator or amplifier (12) and a so-called master oscillator (14). The narrowband output radiation of the master oscillator serves as seed radiation which is injected into the optical parametric oscillator or amplifier (12). In order to obtain a beam profile of the emitted output radiation as homogeneous as possible, optically imaging elements (28) are arranged in an optical delay line (24) for the partial pulses which pump the optical parametric oscillator or amplifier, which transform the spatial beam profile at the output (30) of the pump laser (10) with respect to amplitude, phase and, preferably, the divergence, too, into the crystal of the optical parametric oscillator or amplifier.

6 Claims, 4 Drawing Sheets

TUNABLE SOURCE OF NARROWBAND COHERENT RADIATION

The invention relates to a tunable source of narrowband coherent radiation, comprising
- a pulsed pump laser for the generation of pump pulses;
- an optical parametric oscillator or optical parametric power amplifier with at least one crystal from an optically non-linear material;
- a master oscillator for the generation of a narrowband radiation which is injected as seed radiation into the optical parametric oscillator or power amplifier;
- a beam splitter for separating the pump pulses into first and second partial pulses, with the first partial pulses pumping the master oscillator or the power amplifier and the second partial pulses pumping the optical parametric oscillator of the power amplifier after having travelled through an optical delay line.

Pulsed, tunable, narrowband sources of a coherent radiation are known in particular from DE 42 19 169 A1 and from the product brochure of the assignee LAMBDA PHYSIK covering the product SCANMATE (with SCANMATE OPO), published 1994.

The state of the art is also represented in the articles by W. R. Bosenberg et al. in Journal Opt. Soc. Am. vol. 10, page 1716 (1993) and by A. Fix et al. in Journal Opt. Soc. Am. vol. 10, page 1744 (1993) as well as in the U.S. Pat. Nos. 5,053,641 and 5,047,668.

In DE 42 19 169 A1 a laser arrangement for the generation of a tunable narrowband coherent radiation is described which comprises a so-called master oscillator and an optical parametric oscillator (also referred to as OPO). The master oscillator performs the so-called "seeding" (excitation) of the optical parametric oscillator. For this purpose the bandwidth of the output radiation of the master oscillator is reduced by means of a wavelength selective device and then supplied as the so-called injection radiation (usually referred to as seed radiation) to the optical parametric power oscillator. In this known arrangement the master oscillator is also an OPO. The two optical parametric oscillators are pumped by means of the same pump laser. For this purpose the pump pulses of the pump laser are separated by means of at least one beam splitter into two partial pulses which in general have different energy levels. In order to generate a narrowband output radiation by means of such an arrangement it is necessary for the narrow-band seed radiation generated in the master oscillator to reach the power oscillator approximately at the same time in which the partial pulse of the pump laser pumps the crystal of the optical parametric power oscillator. Because of the finite starting time of the oscillation of the master oscillator (typically a few nanoseconds), an optical delay line is required in the beam path of that partial pulse that pumps the power oscillator in order to take the starting time of the oscillation into account and to ensure that the pump and the seed pulses reach the crystal in a time-synchronized manner. The pulse duration of the partial pulse pumping the OPO crystal typically amounts to a few nanoseconds.

As pump lasers Nd:YAG lasers are currently widely used, mostly Q-switched Nd:YAG lasers with unstable resonators, down-stream arranged amplifiers and subsequent frequency doubling or trebling. With such pump lasers (and also with other pump lasers) the spatial beam profile immediately at the laser output is still relatively homogenous. Due to diffraction effects, however, the spatial homogenity of the output beam of the pump laser decreases considerably after several meters. The beam homogenity will improve again only in the so-called far field (after a beam propagation well above 10 m), and the intensity distribution over the beam cross-section corresponds to a Gaussian curve.

The above mentioned optical delay line for the partial pulse which pumps the crystal of the OPO must be in the range of several meters because of the given conditions (particularly the oscillation starting time of the master oscillator).

The invention is based on the finding that this forced delay line of several meters has the consequence that due to the inhomogeneous beam profile of the pump partial pulse the excitation of the crystal in the optical parametric oscillator will also be inhomogeneous which in turn will bring about an inhomogeneous beam profile of the narrowband output radiation of the optical parametric oscillator. In addition, the above mentioned inhomogeneities in the pump beam profile will also result in local intensity peaks which might lead to a destruction of optical components. Inhomogeneities in the beam profile of the partial pulse itself which pumps the crystal of the OPO might also lead to local destructions in the OPO crystal.

According to the state of the art telescopes are frequently employed for imaging a pump radiation into an OPO crystal. Such telescopes serve to achieve a required pumping power density in the OPO crystal so that an optimum oscillation or amplification, respectively, as well as an optimum adjustment of the divergence of the pump radiation in the OPO are obtained. Such telescopes do not image the amplitude and phase of the spatial beam profile of the pump laser output into the crystal of the OPO or the power amplifier, respectively, (see also SCANMATE Oppo, product brochure of the company Lambda Physik, 03/95, pages 2, 3 as well as Optical Layout: SCANMATE Oppo E; DE 42 19 169 A1; ZHANG, J. Y. et al.: Optical parametric generation and amplification in barium borate and lithium triborate crystals, in J. Opt., Soc. Am. B., Vol. 10, No. 9, 1993, pp. 1758–1764; U.S. Pat. Nos. 4,249,907; and 4,972,156).

The invention is based on the object to design a tunable source of narrowband coherent radiation of the initially mentioned type in such a manner that the homogeneity of the output radiation is improved and the risk of destruction of optical components is reduced.

According to the invention, this object is achieved in that optically imaging elements are arranged in the beam path between the pump laser and the optical parametric oscillator, which image the spatial beam profile of the second partial pulses as it is present at the output of the pump laser with respect to amplitude and phase into the crystal of the optical parametric oscillator or the optical parametric power amplifier. Preferably, the beam profile as it is present at the output of the pump laser is not only imaged with respect to amplitude and phase but also accurately imaged with respect to the divergence of the beam profile into the crystal of the optical parametric oscillator or the optical parametric power amplifier. In this case, the imaging is effected at a scale of 1:1. The crystal is therefore pumped by means of a beam whose profile in the crystal corresponds to the beam profile at the pump laser output to a maximum possible extent.

The invention can be implemented both by means of optical parametric oscillators (OPO) and by means of optical parametric amplifiers (OPA). The latter (OPA) are sometimes also referred to as optical parametric power amplifiers. An "optical parametric oscillator (OP0)" is an optical parametric amplifier about which a resonator is built (similar to a laser). An "optical parametric amplifier (OPA)", however, generally does not comprise a resonator but is rather used for light amplification similar to a laser medium.

According to a preferred embodiment of the invention the optically imaging elements are arranged in the delay line of the partial pulses which pump the crystal of the OPO or OPA.

In a preferred embodiment of the invention the optically imaging elements comprise two lenses.

It is also possible to implement the invention in that the optically imaging elements include a phase conjugative mirror. The principle of the phase conjugation is known per se to those with skill in the art. As a phase conjugative mirror a medium can be used, for example, which has a heavily stimulated Brillioun diffusion (SBS), such as $CS_2$ or freon.

The optically imaging elements may comprise a spatial filter.

Figure 2:
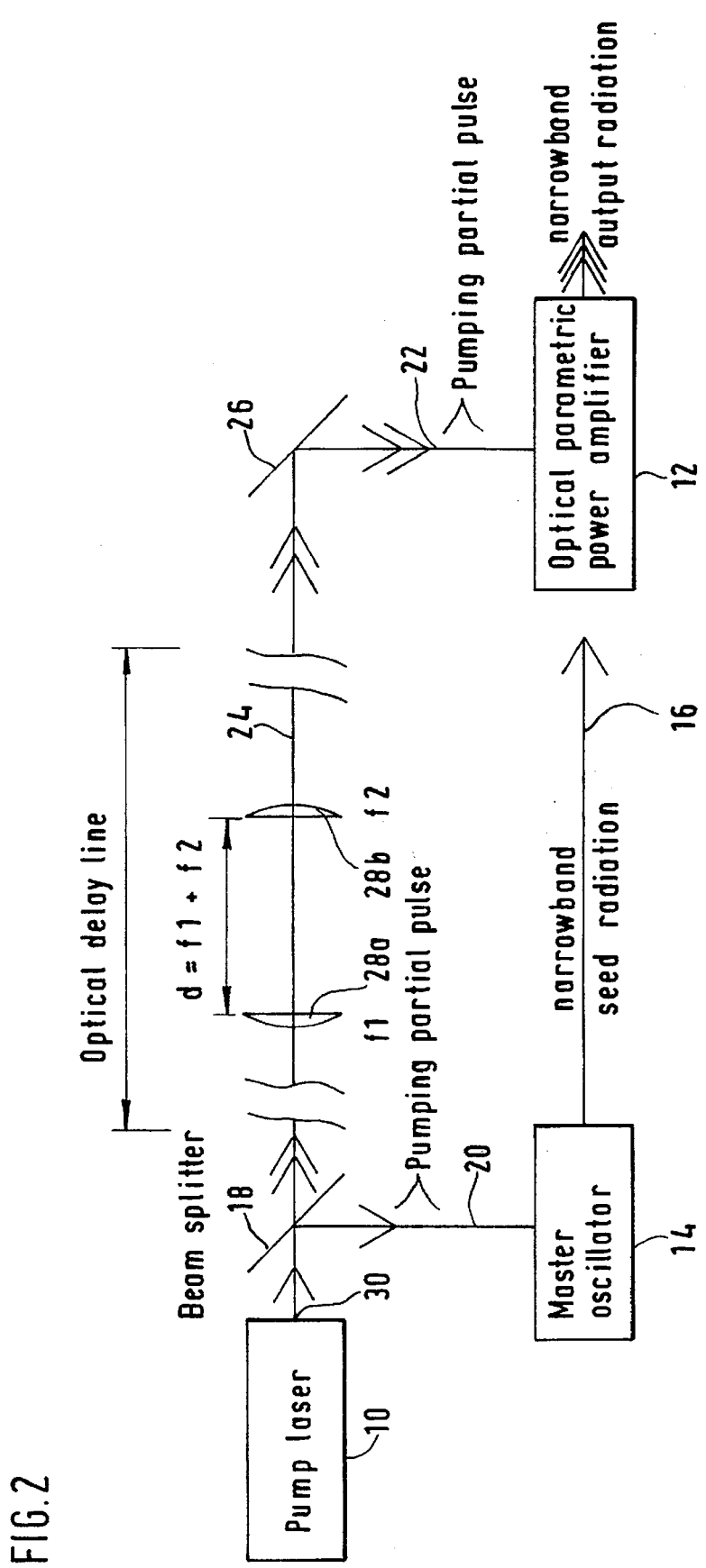
Figure 3:
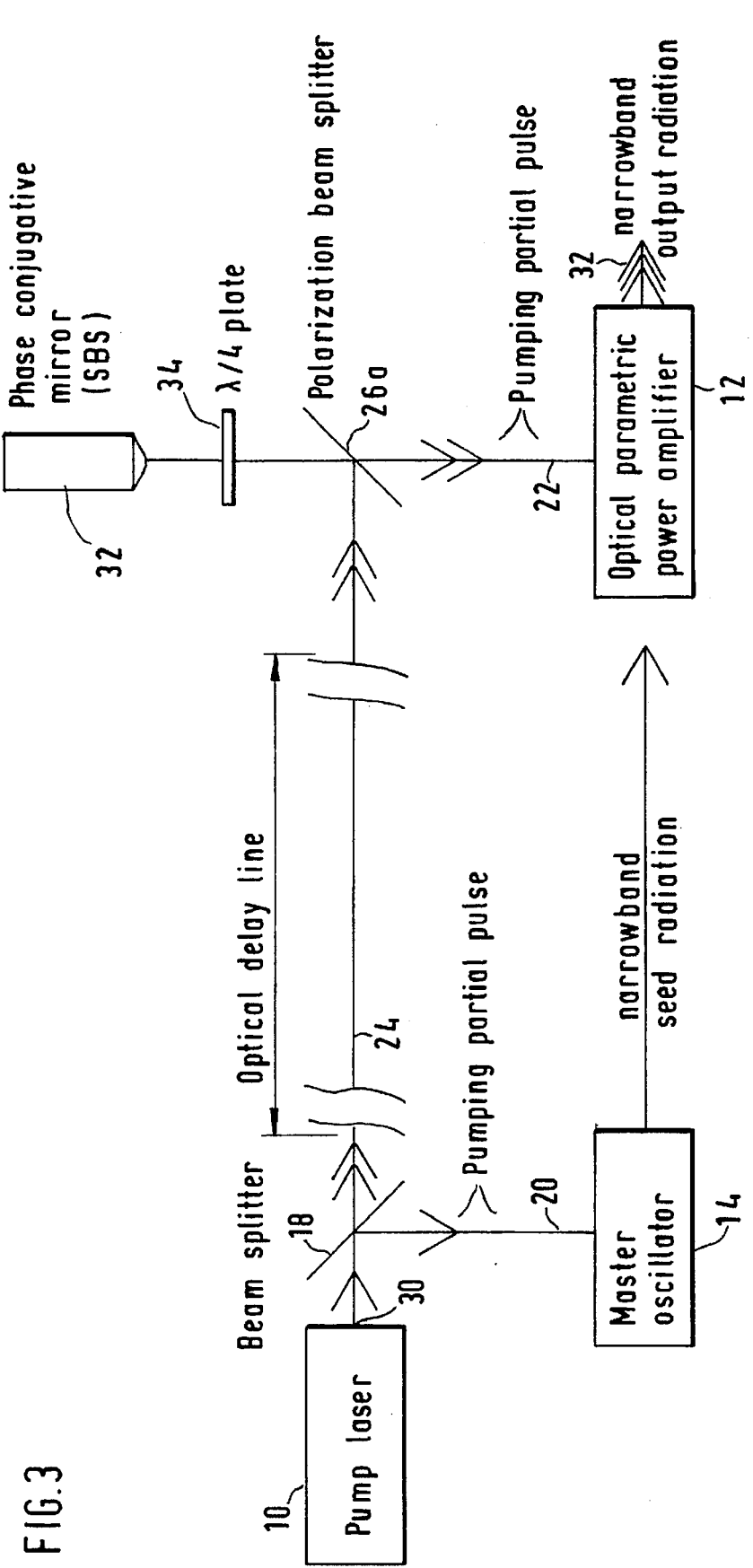
Figure 4:
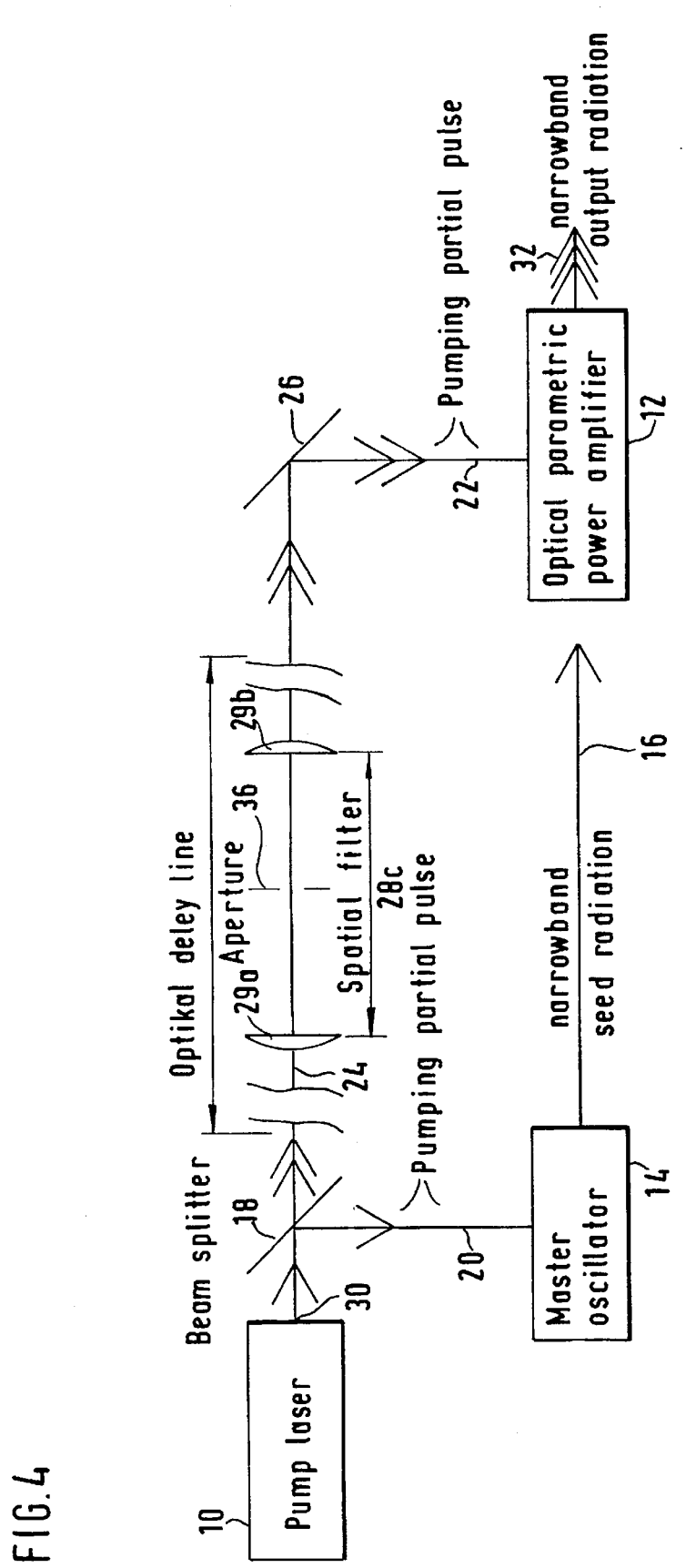

In the following, embodiments of the invention will be described in more detail with reference to the drawings which show schematically:

FIG. 1 a first embodiment of a narrowband tunable source of a coherent radiation; and FIGS. 2 to 4 further embodiments of such sources.

According to FIG. 1 a pump laser 10 is provided which in this embodiment is an Nd:YAG laser with a bandwidth of less than 0.01 $cm^{-1}$ at 355 nm.

The output radiation of the pulsed pump laser 10 is separated into two partial pulses by means of a beam splitter, into a first weaker partial pulse 20 which pumps a so-called master oszillator 14, and into a second stronger partial pulse 22 which pumps the optical parametric oscillator. Instead of the optical parametric oscillator an optical parametric power amplifier can be employed.

The first partial pulse 20 of the pump radiation is directed to the master oscillator 14. In the embodiment described herein, the master oscillator 14 is an arrangement consisting of a dye cell (not shown), a beam expander (not shown), a grating (not shown) and a mirror. Hence, the master oscillator is a dye laser whose bandwidth is considerably reduced by a grating. A master oscillator of this type is known in the state of the art (see also product brochure by LAMBDA PHYSIK).

The partial pulse 22 pumping the OPO travels through an optical delay line 24 and is directed onto the crystal via a mirror 26. The crystal of the optical parametric oscillator 12 is not shown in detail because the optical parametric oscillator 12 per se also corresponds to the state of the art. The optical parametric oscillator emits norrowband coherent radiation which can be tuned by means of adjusting the orientation of the crystal with respect to the pump radiation.

The narrowband output radiation of the master oscillator 14 is injected into the crystal of the the optical parametric oscillator 12 in a manner known per se.

In order to synchronize the arrival of the pump partial pulse 22 at the crystal of the the optical parametric oscillator 12 and the arrival of the seed radiation, the partial pulse 22 travels through the delay line 24 which is schematically indicated in the figures.

As already explained initially, the optical delay line 24 is generally several meters long due to the required time delay, with the result that the partial pulse 22 which pumps the OPO does not have a satisfactory spatial homogeneity (at the crystal). The consequence of this is that the narrowband out-put radiation 32 of the optical parametric oscillator is correspondingly inhomogeneous.

In order to provide a remedy to this, the beam profile of the pump beam is imaged with respect to amplitude, phase and divergence as it is present directly at the output 30 of the pump laser 10 onto the crystal of the optical parametric oscillator 12 or into it, respectively, by means of optically imaging elements 28. The optically imaging elements are schematically indicated in FIG. 1 at reference numeral 28. They are arranged in the delay line 24 of the partial pulse 22.

FIG. 2 shows a preferred embodiment of the optically imaging elements 28 in the form of two lenses 28a, 28b. The remaining components with identical functions are assigned the same reference numerals as in FIG. 1 so that a repeated description is omitted. The two lenses 28a, 28b are arranged in such an manner that their distance d corresponds approximately to the sum of their focal lengths $f_1$ and $f_2$. They are arranged in such a manner that the properties of the beam pulse immediately at the output 30 of the pump laser 10, i.e. the electrical field distribution and the beam divergence, are transformed (imaged) into the crystal to the maximum possible extent.

FIG. 3 shows a modification of the previously described embiments in which a phase conjugative mirror 32 is used. As the phase conjugative mirror, for example, a medium can be used which exhibits a strong stimulated Brillioun diffusion (SBS) such as $CS_2$ or freon. An SBS medium of this type acts above a certain energetic threshold as a mirror which does not only change the direction of the radiation propagation, but also inverts the phase plane of the incident electromagnetic wave, the latter being referred to as "phase conjugation". The consequence of this is that phase changes in the electromagnetic field distribution, which occur upon a propagation of the radiation over a certain distance L, will be cancelled after a reflection at the phase conjugative mirror and a repeated travel through the distance L. If a phase conjugative mirror is placed in front of the output of the pump laser 10 at a distance L, the pump beam is reflected, and the spatial beam profile is reproduced in the reflected beam after travelling through the distance L exactly as it was at the outpout of the pump laser 10. This is implemented in the embodiment according to FIG. 3 in that the linearly polarized light of the pump pulse emitted from the pump laser 10 is reflected at a polarization beam splitter 26a and then travels through a quarter-wavelength plate 34 which renders the linearly polarized pump radiation a circularly polarized radiation. The pump pulse then impinges on the phase conjugative mirror 32 which reflects the pump pulse and inverts the phase plane. A repeated passage through the quarter-wavelength plate rotates the polarization of the reflected pulse by 90° relative to the incident beam. The distance between the output 30 of the pump laser 10 and the phase conjugative mirror 32 is selected in such a manner that it equals the distance between the phase conjugative mirror 32 and the crystal of the optical parametric oscillator (OPO) or the optical parametric amplifier (OPA). The result is that the beam profile is directly reproduced from the output 30 of the pump laser into the OPO or OPA crystal.

FIG. 4 shows another embodiment of a narrowband tunable source of coherent radiation in which the optically imaging elements include a spatial filter. In this embodiment the spatial filter consists of two lenses 29a, 29b and an aperture 36. The overall arrangement forms a spatial filter 28c. The size of the aperture 36 is selected in such a manner that any secondary lobes which might occur upon the focusing of the pump pulse by the first lense 29a are cut off by the aperture 36 so that only the centre maximum of the intensity distribution can pass the aperture unimpeded. Because the disstance between the two lenses 29a, 29a is again selected as it is in FIG. 2, the spatial beam profile from the pump laser output 30 is imaged essentially univalidated into the OPO/OPA crystal which with a suitably selected diameter of the aperture 36 improves the beam homogeneity even further.

We claim:

1. A tunable source of narrowband coherent radiation, comprising:

a pulsed pump laser for the generation of pump pulses;

an optical parametric oscillator or optical parametric power amplifier with at least one crystal from an optically non-linear material;

a master oscillator for the generation of a tunable narrowband radiation which is injected as seed radiation into the optical parametric oscillator or power amplifier;

a beam splitter for separating the pump pulses into first and second partial pulses, with the first partial pulses pumping the master oscillator and the second partial pulses pumping the optical parametric oscillator or the power amplifier after having travelled through an optical delay line; and an optical imaging element arranged in the beam path between the pump laser and the optical parametric oscillator or power amplifier, said optical imaging element configured to image the spatial beam profile of the second partial pulses from the output of the pump laser with respect to amplitude and phase into the crystal of the optical parametric oscillator or the optical parametric power amplifier.

2. A tunable source of narrowband coherent radiation according to claim 1, wherein the optical imaging element is arranged in a delay line of the second partial pulses.

3. A tunable source of narrowband coherent radiation according to one of claims 1 or 2, wherein the optical imaging element comprise two lenses.

4. A tunable source of narrowband coherent radiation according to one of claims 1 or 2, wherein the optical imaging element comprise a phase conjunctive mirror.

5. A tunable source of narrowband coherent radiation according to one of claims 1 or 2, wherein the optical imaging element comprise a spatial filter.

6. A tunable source of narrowband coherent radiation according to one of claims 1 or 2, wherein the optical imaging element image the spatial beam profile of the second partial pulses at the output of the pump laser also with respect to the divergence into the crystal of the optical parametric oscillator or the optical parametric power amplifier.

* * * * *